(12) United States Patent
Iriyama et al.

(10) Patent No.: US 7,282,010 B2
(45) Date of Patent: Oct. 16, 2007

(54) ENGINE TORQUE CONTROL DEVICE

(75) Inventors: Masahiro Iriyama, Yokohama (JP); Masami Murayama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 245 days.

(21) Appl. No.: 11/245,192

(22) Filed: Oct. 7, 2005

(65) Prior Publication Data

US 2006/0080020 A1    Apr. 13, 2006

(30) Foreign Application Priority Data

Oct. 12, 2004    (JP)    ............................... 2004-298136

(51) Int. Cl.
*B60W 10/04* (2006.01)
(52) U.S. Cl. ........................ 477/107; 477/110
(58) Field of Classification Search ................ 477/107, 477/110
See application file for complete search history.

(56) References Cited

U.S. PATENT DOCUMENTS

| 5,058,015 | A | 10/1991 | Leorat |
| 5,498,195 | A | 3/1996 | White et al. |
| 5,863,275 | A | 1/1999 | Nozaki et al. |
| 5,944,765 | A * | 8/1999 | Saito et al. .................... 701/54 |
| 6,503,171 | B1 | 1/2003 | Bockmann et al. |
| 6,726,594 | B2 * | 4/2004 | Mizuno et al. ............... 477/37 |
| 6,866,612 | B2 * | 3/2005 | Tokura et al. .............. 477/176 |

FOREIGN PATENT DOCUMENTS

| EP | 0834681 A | 4/1998 |
| EP | 0853017 A | 7/1998 |
| JP | 9-105458 A | 4/1997 |

* cited by examiner

*Primary Examiner*—Ha D. Ho
(74) *Attorney, Agent, or Firm*—Global IP Counselors, LLP

(57) ABSTRACT

An engine torque control device is configured to provide increase engine output torque during shifting, with excessive engine output torque being prevented while shift shock is reduced. The engine torque control device has an automatic transmission control section that controls an automatic transmission and an engine output torque control section that performs a torque increasing control of an engine output torque to increase the engine output torque during a downshifting so that an actual engine speed will substantially approach a target speed. The allowable time for torque increasing control is set according to the amount of torque increase. If the increase in engine output torque is below a specified value at the point when the allowable time has elapsed, the torque increasing control is continued, but if the torque increase is at or above the specified value when the allowable time has elapsed, the torque increasing control is forcibly halted.

19 Claims, 11 Drawing Sheets

ENGINE TORQUE CONTROL DEVICE

CROSS-REFERENCE TO RELATED APPLICATIONS

This application claims priority under 35 U.S.C. § 119 to Japanese Patent Application No. 2004-298136. The entire disclosure of Japanese Patent Application No. 2004-298136 is hereby incorporated herein by reference.

BACKGROUND OF THE INVENTION

1. Field of the Invention

The present invention relates to an engine torque control device that increases engine output torque during the downshifting of an automatic transmission so that the engine speed will substantially match or approach a target speed.

2. Background Information

Japanese Laid-Open Patent Publication No. 09-105458 discloses a technique for reducing shift shock by increasing engine output torque during the downshifting of an automatic transmission having a stepped shifting mechanism. With this torque increasing control during downshifting, a shift shock is prevented by increasing engine output torque during an inertia phase, lasting from when the friction engagement elements that were engaged in a pre-shift gear begin to be disengaged until the friction engagement elements to be engaged in the next gear begin to be engaged.

In view of the above, it will be apparent to those skilled in the art from this disclosure that there exists a need for an improved engine torque control device. This invention addresses this need in the art as well as other needs, which will become apparent to those skilled in the art from this disclosure.

SUMMARY OF THE INVENTION

It has been discovered that with such an engine output torque increasing control aimed at reducing shift shock during downshifting as described above, the engine output torque at which the post-downshift engine speed (hereinafter referred to as the synchronizing target torque) will be attained is computed, and the engine output torque is controlled on the basis of this synchronizing target torque.

However, with an automatic transmission equipped with a manual shift mode, in which shift commands can be made manually, downshifts are made by driver operation, so there is the danger that a synchronizing target torque higher than assumed will be computed, resulting in unnecessarily high engine speed.

Regardless of whether in a manual shift mode or an automatic shift mode, if the synchronizing target torque is computed erroneously, or if there is a problem with the increased torque requirement signal, there is the possibility that torque exceeding the assumed level will be inputted to the automatic transmission during shifting, which adversely affects the durability of the friction engagement elements.

The present invention was conceived in light of these problems encountered in the past. One object of the present invention is to provide an engine torque control device that increases engine output torque during shifting, wherein excessive engine output torque is reliably prevented while a reduction in shift shock is achieved by synchronizing.

Accordingly, the engine control device pertaining to the present invention is an engine torque control device which increases engine output torque during the downshifting of an automatic transmission so that the engine speed will match a target speed. In other words, in order to achieve the object, the present invention provides an engine torque control device comprising an automatic transmission control section and an engine output torque control section. The automatic transmission control section is configured to perform an automatic transmission control of an automatic transmission. The engine output torque control section is configured to perform an engine output torque increasing control of an engine output torque from an engine such that engine output torque increases during a downshifting of the automatic transmission so that an actual engine speed will substantially approach a target speed. The engine output torque control section is further configured to set an allowable time to perform the torque increasing control, and to forcibly halt the torque increasing control at a point when the allowable time has elapsed since starting the engine output torque increasing control if an increase in the engine output torque is equal to or greater than a specific amount, and to allow the engine output torque increasing control to continue if the increase is less than the specific amount.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
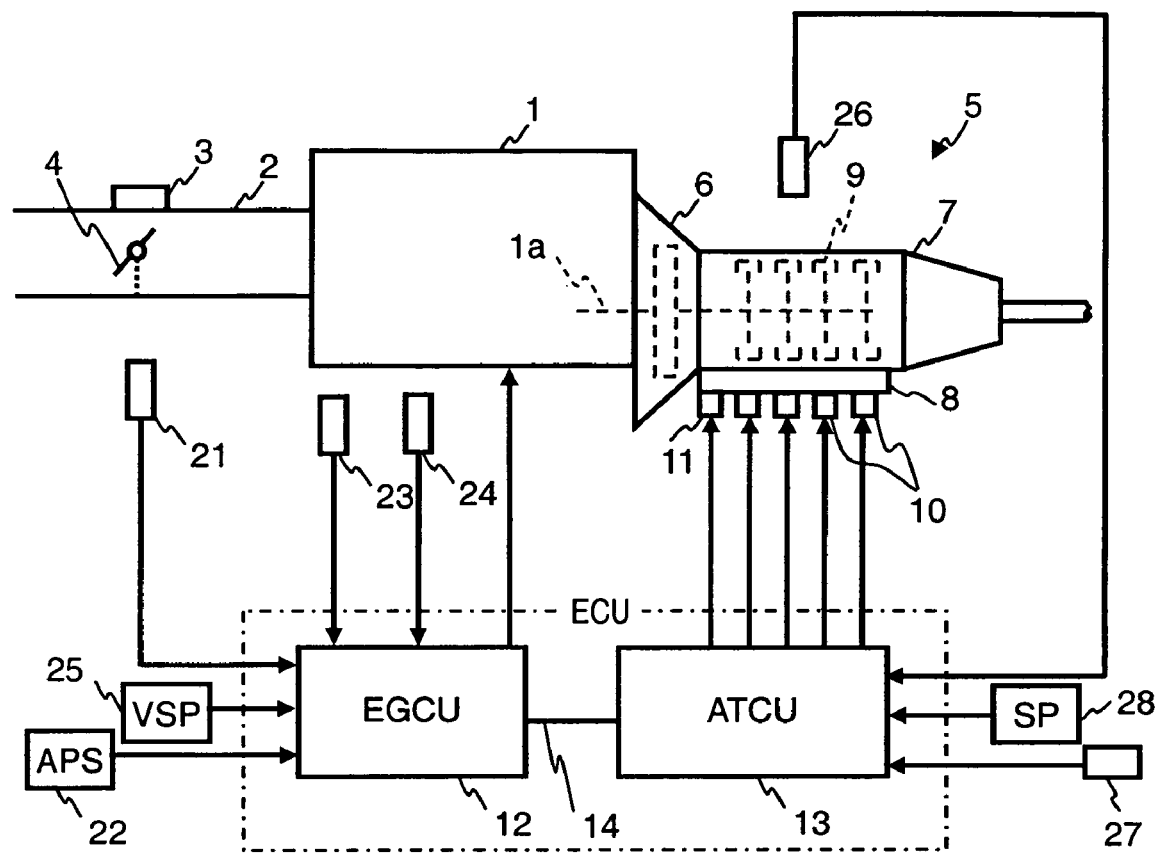
FIG. 1 is a schematic diagram of an internal combustion engine that is equipped with an engine torque control device or system in accordance with one embodiment of the present invention.

Referring initially to FIG. 1, an internal combustion engine 1 is schematically illustrated that is equipped with an engine torque control device or system in accordance with one embodiment of the present invention. In FIG. 1, the engine 1 receives intake air through an air intake passage 2 such that the intake air is supplied to each cylinder of the engine 1. The intake air passing through the air intake passage 2 to each cylinder is regulated by controlling a throttle motor 3 that operates a throttle valve 4. The operation of the throttle valve 4 by the throttle motor 3 can be accomplished in a conventional manner. Since operation of the throttle valve 4 by the throttle motor 3 can be accomplished in a conventional manner, these structures will not be discussed or illustrated in detail herein.

An automatic transmission 5 is linked on the output side of the engine 1 in a conventional manner. This automatic transmission 5 has an automatic shift mode as well as a manual shift mode that allows the driver to shift manually. The automatic transmission 5 basically includes a torque converter 6, a shifting mechanism (gear mechanism) 7 and a hydraulic control mechanism 8. The torque converter 6 is linked to the output shaft 1a of the engine 1, with the shifting mechanism 7 being linked to the output side of this torque converter 6. The hydraulic control mechanism 8 is configured and arranged to engage and disengage various shift elements 9 (clutches, etc.) in the shifting mechanism 7.

The working hydraulic pressure of the hydraulic control mechanism 8 is controlled through various electromagnetic valves. The various electromagnetic valves are conventional components that are well known in the art. Since electromagnetic valves are well known in the art, these structures will not be discussed or illustrated in detail herein. Rather, only four shift solenoids 10 and a lock-up solenoid 11 will be depicted herein for the sake of simplicity and brevity. The shift solenoids 10 are configured and arranged to perform an automatic shifting operation. The lock-up solenoid 11 is configured and arranged to perform to lock up the torque converter 6 for transferring torque directly from the engine to the automatic transmission 5.

The operation of the engine 1 is controlled by an engine control unit (EGCU) 12, and the operation of the automatic transmission 5 is controlled by an automatic transmission control unit (ATCU) 13. The engine control unit 12 and the automatic transmission control unit 13 are connected by a communications line 14, allowing specific information, including detection signals, to be sent back and forth between the two. Thus, the shift solenoids 10 and the lock-up solenoid 11 are operatively connected to both the engine control unit 12 and the automatic transmission control unit 13 to selectively control the engagement and disengagement of the shift solenoids 10 and the lock-up solenoid 11 as explained below.

The engine control unit 12 preferably includes a microcomputer with an engine control program that controls the operation of the engine 1. Similarly, the automatic transmission control unit 13 preferably includes a microcomputer with an automatic transmission control program that controls the operation of the automatic transmission 5 and an automatic shifting control program that controls the shift solenoids 10 and the lock-up solenoid 11 as well as electromagnetic valves to perform upshifting and downshifting operations. The control units 12 and 13 also preferably include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the control units 12 and 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Moreover, the control units 12 and 13 can be integrated into a single electronic control unit ECU with one or more processors, as shown. In other words, the control units 12 and 13 can have separate components or can share components.

Various signals are inputted to the engine control unit 12 from various sensors including, but not limited to, a throttle sensor 21, an accelerator operation sensor 22, a water or coolant temperature sensor 23, an engine speed sensor 24, and a vehicle speed sensor 25. These signals are sent by the communications line 14 to the automatic transmission control unit 13 as needed and/or desired. The throttle sensor 21 is configured and arranged to detect throttle opening amount or degree of the throttle valve 4, and output a signal indicative of the throttle opening degree of the throttle valve 4 to the engine control unit 12. The accelerator operation sensor 22 is configured and arranged to detect the accelerator pedal depression amount APS, and output a signal indicative of the accelerator pedal depression amount APS to the engine control unit 12. The water or coolant temperature sensor 23 is configured and arranged to detect the engine cooling water or coolant temperature Tw, and output a signal indicative of the engine coolant temperature Tw to the engine control unit 12. The engine speed sensor 24 is configured and arranged to detect the engine speed Ne, and output a signal indicative of the engine speed Ne to the engine control unit 12. The vehicle speed sensor 25 is configured and arranged to detect the vehicle speed VSP, and output a signal indicative of the vehicle speed VSP to the engine control unit 12.

Various signals are inputted to the automatic transmission control unit 13 from various sensors including, but not limited to, a gear position sensor 26, a shift mode switch 27, and a shift position sensor 28. These signals are sent by the communications line 14 to the engine control unit 12 as needed and/or desired. The gear position sensor 26 is configured and arranged to detect the gear position Gp of the gear mechanism of the automatic transmission 5, and output a signal indicative of the gear position Gp to the automatic transmission control unit 13. The shift mode switch 27 is configured and arranged to set the shift mode (automatic shift mode or manual shift mode) of the automatic transmission 5, and output a signal indicative of the current shift mode to the automatic transmission control unit 13. The shift position sensor 28 is configured and arranged to detect the shift lever position SP, and output a signal indicative of the shift lever position SP to the automatic transmission control unit 13.

In automatic shift mode, the automatic transmission control unit 13 (automatic transmission control section) sets the optimal gear by referring to a preset map, etc., and controls the shift solenoids 10 so that the optimal gear is achieved, on the basis of the accelerator operation amount APS and the vehicle speed VSP. In manual shift mode, the automatic transmission control unit 13 (automatic transmission control section) sets the gear to one gear higher or one gear lower than the current gear, according to whether the driver has used the shift lever to make an upshift or a downshift, and controls the shift solenoids 10 so that the selected gear is achieved.

Also, the engine control unit 12 performs engine output control by performing engine control such as fuel injection control and ignition timing control on the basis of signals from the various sensors mentioned above. The engine control unit 12 also computes the target engine torque on the basis of the accelerator operation amount APS and so forth, and drives the throttle motor 3 to control the opening of the throttle valve 4 so that this target engine torque will be obtained. Engine output control during a downshift (torque increasing control) executed by the engine control unit 12 will now be described with reference to FIG. 2.

Figure 2:
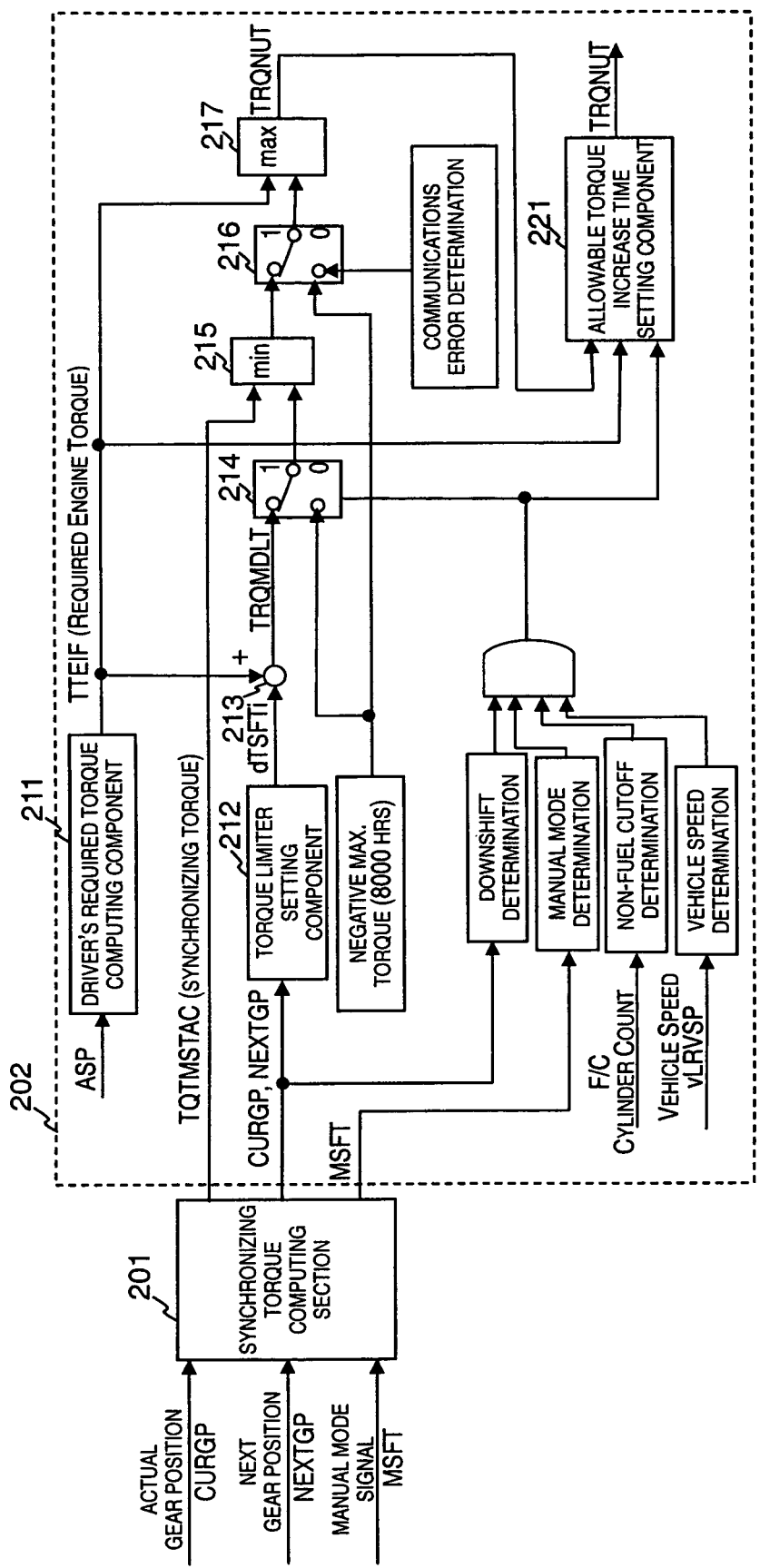
FIG. 2 is a simplified block diagram illustrating torque-up control (synchronizing control) during a downshift operation using the engine torque control device in accordance with one embodiment of the present invention.

FIG. 2 is a block diagram of the engine output control functions of the engine control unit 12. As shown in FIG. 2, the engine output control functions of the engine control unit 12 include a synchronizing torque computing section 201 and a target engine torque computing section 202. With the above constitution, as explained below, if the increase in torque at the point when the torque increasing control has continued for the allowable time is, for example, small enough for the engine speed to be maintained, then even if the torque increasing control is continued unchanged, it will not lead to an unnecessary rise in engine speed or the like, which helps reduce shift shock, so torque increasing control is continued. On the other hand, if the increase in torque at the point when the torque increasing control has continued for the allowable time is large, it is determined that it may lead to shift shock as a result of an unnecessarily large torque increase, or that the durability of the friction engagement elements may be adversely affected, so the torque increasing control is forcibly halted, which prevents shift shock from occurring and prevents damage to the friction engagement elements.

The synchronizing torque computing section 201 is configured to estimate a post-downshift engine speed from the post-shift gear and the vehicle speed when it is detected that the driver has performed a downshift operation in a manual shift mode (that is, when there is a downshift requirement). The engine output torque (synchronizing torque) TQTMSTAC for attaining the estimated engine speed is then computed on the basis of the actual engine speed Ne at that point and the estimated post-shift engine speed. By controlling the engine output torque on the basis of the engine output torque (synchronizing torque) TQTMSTAC, the friction engagement elements are selectively engaged in a state in which the post-downshift engine speed has been attained, and shift shock is reduced. The synchronizing torque TQTMSTAC is outputted to the target engine torque computing section 202 as discussed below.

The target engine torque computing section 202 is configured to compute the target engine output torque (synchronizing target torque) TRQNUT during a downshift as follows. The target engine torque computing section 202 includes a driver's required engine torque computing component 211, a torque limiter setting component 212, an adder component 213, a first switching output component 214, a first comparator component 215, a second switching output component 216, a second comparator component 217 and an allowable torque increase time setting component 221 (discussed below). The target engine output torque (synchronizing target torque) TRQNUT during a downshift is computed as follows.

First, the driver's required engine torque computing component 211 is configured to compute an engine output torque (required engine torque) TTEIF required by the driver on the basis of the accelerator operation amount APS. This required engine torque TTEIF is then outputted to the adder component 213 and the second comparator component 217 (discussed below).

The torque limiter setting component 212 is configured to set an upper torque increase limit dTSFTi (with a four-speed automatic transmission, i=1 to 4) for limiting the amount of torque increase with respect to the required engine torque TTEIF when there is a downshift requirement for each gear. In this embodiment, the upper torque increase limit dTSFTi is set, for example, so as to prevent a sudden increase in the engine output torque (input torque to the automatic transmission 5) for the purpose of ensuring safety and performance. The upper torque increase limit dTSFTi is selectively set for each actual gear position CURGP (see FIG. 4).

The adder component 213 is configured to add the upper torque increase limit dTSFTi to the required engine torque TTEIF to calculate the upper limit of the engine output torque (synchronizing limit torque) TRQMDLT (TRQMDLT=TTEIF+dSFTi) during a downshift. This value is outputted to the first switching output component 214.

The first switching output component 214 outputs the synchronizing limit torque TRQMDLT to the first comparator component 215 on the conditions that there is a downshift requirement, the manual shift mode is being used, no fuel cutoff is in progress, the vehicle speed VSP is at least a specific speed (such as 10 km/h), and so forth. If any of the above conditions are not met, however, a dummy value (such as the negative maximum torque) is outputted to the first comparator component 215. Thus, the required engine torque TTEIF is ultimately set as the target engine torque during a downshift.

The reason for determining whether a fuel cutoff is in progress is that if the synchronizing limit torque TRQMDLT is selected during fuel cutoff, which reduces the engine output torque (engine speed), this will be contrary to the control whereby the engine output torque is increased. Thus, avoiding this situation ensures better control stability.

The reason for determining the vehicle speed is so that downshifting produces little shift shock at lower vehicle speeds. Thus, excluding this speed range allows the control to be carried out more effectively, and also reduces the computational load.

The first comparator component 215 is configured to compare the torque outputted from the first switching output component 214 with the synchronizing torque TQTMSTAC and set the lower of the two, which is outputted to the second switching output component 216. As a result, when there is a downshift requirement that meets the above conditions, the synchronizing torque TQTMSTAC computed in order to reduce shift shock is only selected when it is less than the synchronizing limit torque TRQMDLT set as the upper limit for the purpose of ensuring safety and performance.

The second switching output component 216 is configured to output the torque outputted from the first comparator component 215 to the second comparator component 217 on the condition that there is no communications error or the like between the synchronizing torque computing section 201 and the target engine torque computing section 202. If, however, there is a communications error, then just as with the first switching output component 214, a dummy value (such as the negative maximum torque) is outputted to the second comparator component 217, and the required engine torque TTEIF is ultimately set as the target torque.

The second comparator component 217 is configured to compare the torque outputted from the second switching output component 216 with the required engine torque TTEIF, and selects the larger of the two, which is termed the synchronizing target torque TRQNUT. As a rule, the engine control unit 12 suppresses shift shock while effectively avoiding an excessive increase in torque during a downshift by driving the throttle motor 3 to control the opening of the throttle valve 4 so that this synchronizing target torque TRQNUT will be obtained. However, as will be discussed below, if the synchronizing target torque TRQNUT exhibits an abnormal increase due to circuit malfunction, noise, or the like, failsafe control is performed in which the output time is limited.

Figure 3:
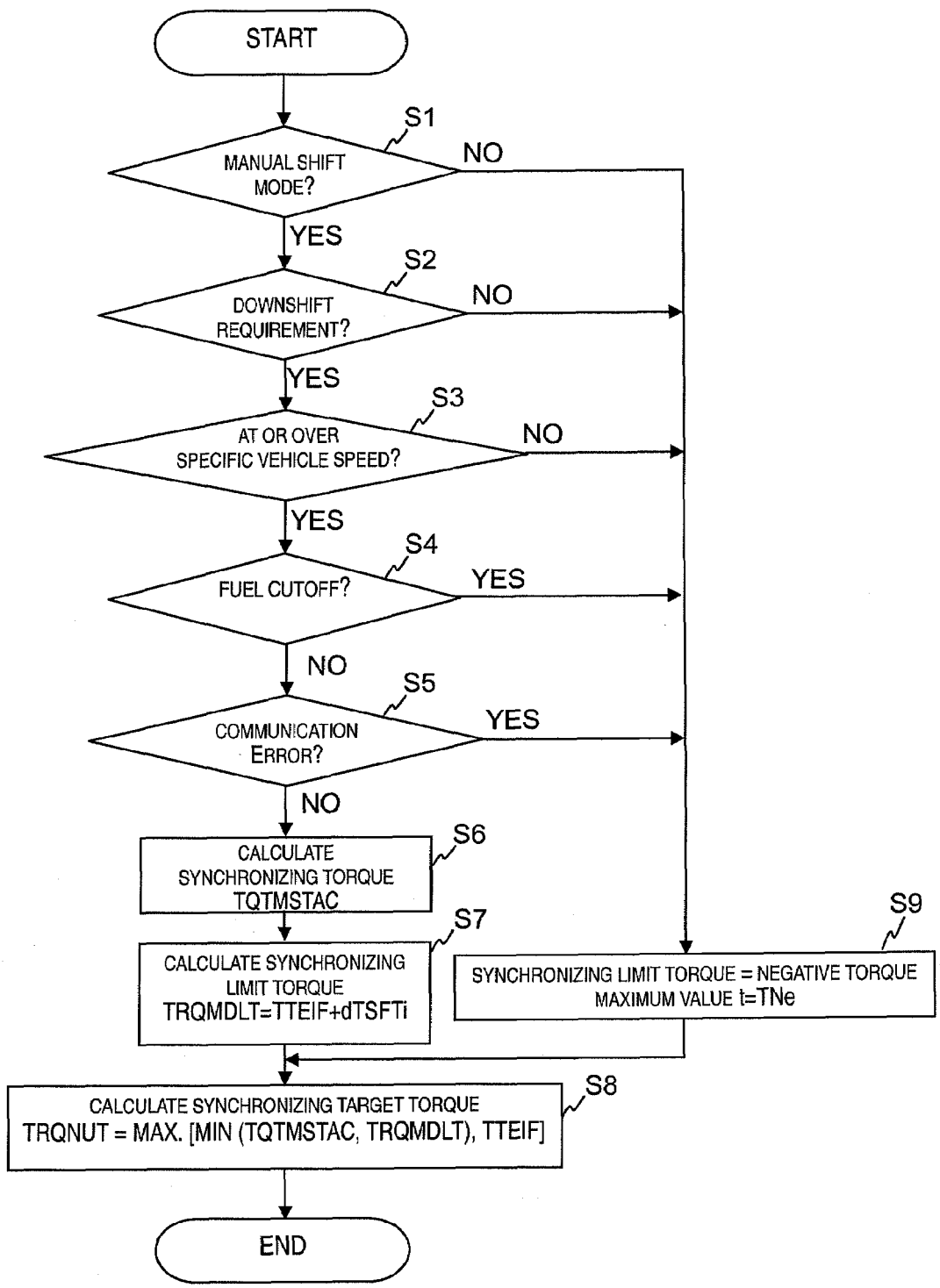
FIG. 3 is a flowchart illustrating the processing that is executed by the torque-up control (synchronizing control) during of the downshift operation in accordance with one embodiment of the present invention.

FIG. 3 is a flowchart of the torque increasing control during a downshift in the manual shift mode described above.

In step S1 of FIG. 3, the torque increasing control determines whether or not the shift mode of the automatic transmission 5 is in the manual shift mode. This determination is performed on the basis of the input signal from the shift mode switch 27. If the transmission is in the manual shift mode, then the process proceeds to step S2, but if not (if the transmission is in automatic shift mode), then the process proceeds to step S9.

In step S2, the torque increasing control determines whether or not there is a downshift requirement. This determination is performed on the basis of the input signal from the shift position sensor 27. If there is a downshift requirement, then the process proceeds to step S3. However, if there is no downshift requirement, then the process proceeds to step S9.

In step S3, the torque increasing control determines whether or not the vehicle speed VSP is at or over a specific prescribed speed (such as 10 km/h). This determination is performed on the basis of the input signal from the vehicle speed sensor 25. If the vehicle speed is at or over the specific prescribed speed (such as 10 km/h), then the process proceeds to step S4, but if not (if the vehicle speed is below the specific prescribed speed), then the process proceeds to step S9.

In step S4, the torque increasing control determines whether or not fuel cutoff is in progress. This determination is performed based on the control of the engine control unit 12. If a fuel cutoff is not in progress then the process proceeds to step S5. However, if a fuel cutoff is in progress, then the process proceeds to step S9.

In step S5, the torque increasing control determines whether or not there is a communications error. For example, a communications error is determined to exist, if the synchronizing torque TQTMSTAC is not inputted from the synchronizing torque computing section 201 to the target engine torque computing section 202, or if this torque was inputted but is an abnormal value. If there are no communications errors, then the process proceeds to step S6. However, if a communications error is determined to exist, then the process proceeds to step S9.

In step S6, the synchronizing torque TQTMSTAC at which the actual engine speed will substantially match or approach the post-shift target engine speed is calculated in order to suppress shift shock during a downshift. Then, the process proceeds to step S7.

In step S7, the upper torque increase limit dTSFTi corresponding to the gear in question is added to the driver's required torque TTEIF to calculate the upper synchronizing limit torque TRQMDLT (TRQMDLT=TTEIF+dTSFTi) for ensuring safety and performance.

In step S8, the synchronizing torque TQTMSTAC is compared to the upper synchronizing limit torque TRQMDLT. The smaller of the two values is then selected. Next, the selected torque is compared to the driver's required torque TTEIF, such that the larger of the two values is then set as the synchronizing target torque TRQNUT.

Meanwhile, in steps S1 to S5, if the transmission is not in manual shift mode, or if there is no downshift requirement, or if the vehicle speed is below the specified speed, or if fuel cutoff is in progress, or if there is a communications error, then the process proceeds to step S9, and the negative torque maximum value is set as the synchronizing limit torque. In this case, the driver's required torque TTEIF is set as the target engine torque (step S9→step S8).

Figure 4:
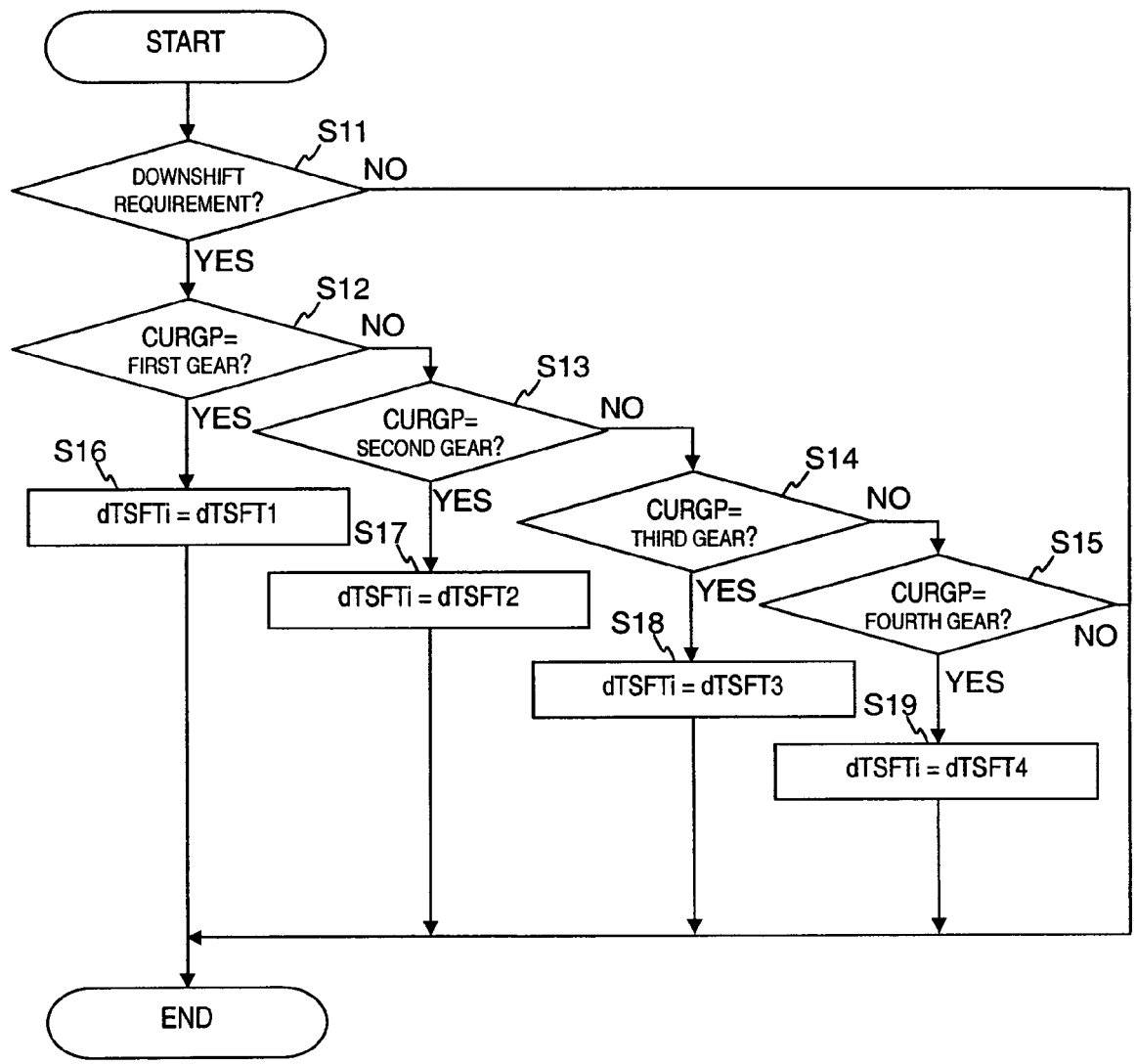
FIG. 4 is a flowchart illustrating the processing that is executed by the torque-up control (synchronizing control) to set the upper torque increase limit.

Referring now to FIG. 4, a flowchart is illustrated for setting the upper torque increase limit dTSFTi (where, i=1 to 4) by the torque limiter setting component 212.

In step S11 of FIG. 4, the torque limiter setting component 212 determines whether or not there is a downshift requirement. If a downshift requirement exists, then the process proceeds to step S12, but otherwise the process is concluded.

In steps S12 to S15, the torque limiter setting component 212 determines which of the first to fourth gears corresponds to the current actual gear position CURGP.

In step S12, if the current actual gear position CURGP is determined to be the first gear, then the process proceeds to step S16, where the upper torque increase limit dTSFT1 (such as 35 N) is set for the first gear. Then the process is concluded.

In step S13, if the current actual gear position CURGP is determined to be the second gear, then the process proceeds to step S17, where the upper torque increase limit dTSFT2 (such as 55 N) is set for the second gear. Then the process is concluded.

In step S14, if the current actual gear position CURGP is determined to be the third gear, then the process proceeds to step S18, where the upper torque increase limit dTSFT3 (such as 85 N) is set for the third gear. Then the process is concluded.

In step S15, if the current actual gear position CURGP is determined to be the fourth gear, then the process proceeds to step S19, where the upper torque increase limit dTSFT4 (such as 126 N) is set for the fourth gear. Then the process is concluded.

The above is an example of a procedure for controlling the torque increase of an automatic transmission to which the present invention is applicable. The present invention is characterized in that an excessive increase in torque is avoided in the course of this torque increasing control. This point will now be described in detail with reference to FIG. 5.

Figure 5:
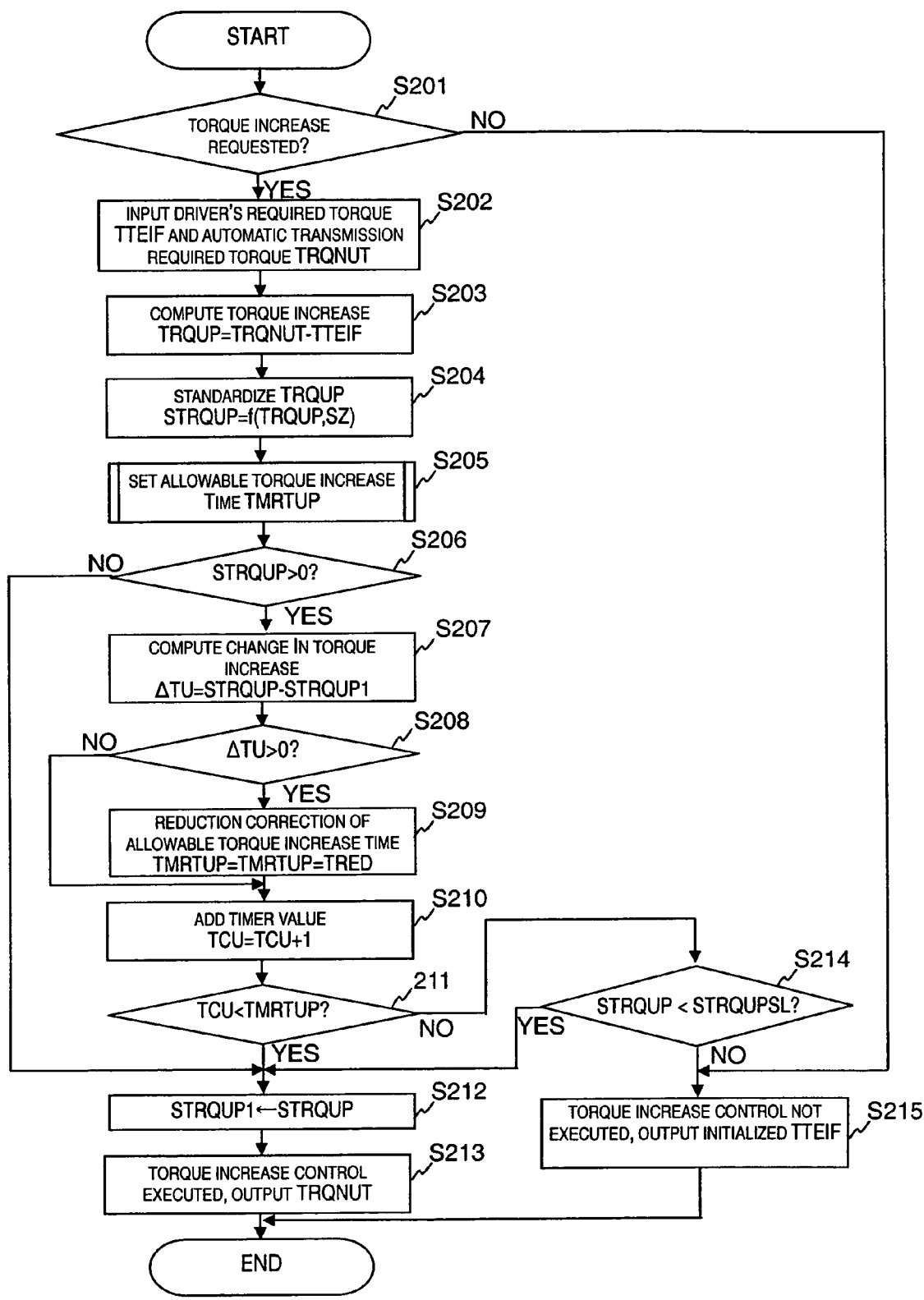
FIG. 5 is a first flowchart illustrating the processing that is executed by the torque-up control (synchronizing control) to set the allowable torque increase time.

In FIG. 5, the allowable torque increase time setting component 221 sets the time allowed for torque increasing control in the course of the above-mentioned torque increasing control during a downshift. The allowable torque increase time setting component 221 sets the allowable torque increase time TMRTUP corresponding to the amount of torque increase on the basis of the required engine torque TTEIF from the driver's required torque computing component 211 and the target engine torque TRQNUT from the second comparator component 217, and allows the output of the target engine torque TRQNUT using this allowable time TMRTUP as a limit.

The operation of the allowable torque increase time setting component 221 will be described in detail through reference to the flowchart shown in FIG. 5.

In step S201, the allowable torque increase time setting component 221 determines whether or not there is an increased torque requirement. This is the same as described above, and the determination is made according to the processing shown in the flowchart of FIG. 3. If there is no increased torque requirement, then the process moves to step S215 and the current processing is concluded.

In step S215, the torque increasing control is initialized. The allowable torque increase time TMRTUP, a stored value STRQUP (discussed below), and a count-up timer value TCU are each set to zero, and the target engine torque TRQNUT is outputted without modification. Because there is no increased torque requirement, the target engine torque TRQNUT at this point is equal to the driver's required torque TTEIF that is outputted as the comparison result from the second comparator component 217.

If there is an increased torque requirement at this point (step S201), then the driver's required torque TTEIF and the target engine torque TRQNUT are read in at step S202. The target engine torque TRQNUT at this point is under the condition that an increased torque requirement has been generated. So basically, the target engine torque TRQNUT is the synchronizing torque TRQMLT calculated by the synchronizing torque computing section 201. The target engine torque TRQNUT when outputted as the synchronizing torque TRQMLT will hereinafter be called the automatic transmission required torque.

In step S203, the torque increase amount TRQUP is calculated from the difference between the automatic transmission required torque TRQNUT and the driver's required torque TTEIF.

Next, in step S204, the torque increase amount TRQUP is converted to a torque increase amount STRQUP that has been standardized by the ratio SZ between the gear ratio of the current gear and a specific reference gear ratio. This processing allows a single table to be used when the allowable torque increase time is looked up in a table, regardless of the gear in question.

Therefore, when an allowable torque increase time setting table is read for each gear, the torque increase amount TRQUP can be applied directly to table look-up.

Figure 6:
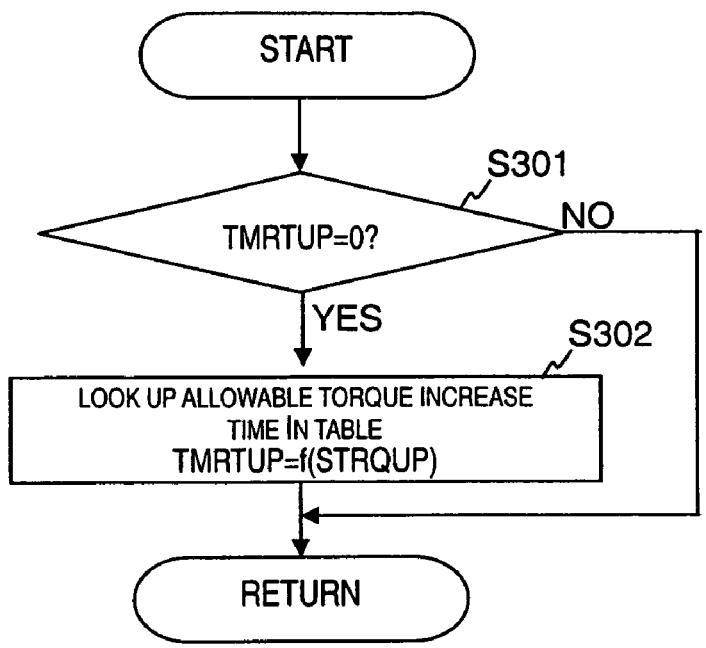
FIG. 6 is a second flowchart illustrating the processing that is executed by the torque-up control (synchronizing control) to set the allowable torque increase time.

In step S205, the allowable torque increase time TMRTUP is set according to the standardized torque increase amount STRQUP by the processing shown in the flowchart of FIG. 6.

First, in step S301, the current value of the allowable torque increase time TMRTUP is checked, and only if it is zero is the allowable torque increase time TMRTUP set in the following step S302.

At the start of torque increasing control, the allowable torque increase time TMRTUP is zero because of the initialization performed in step S215 as discussed above, so the allowable torque increase time TMRTUP is set only at the start of the torque increasing control.

Figure 7:
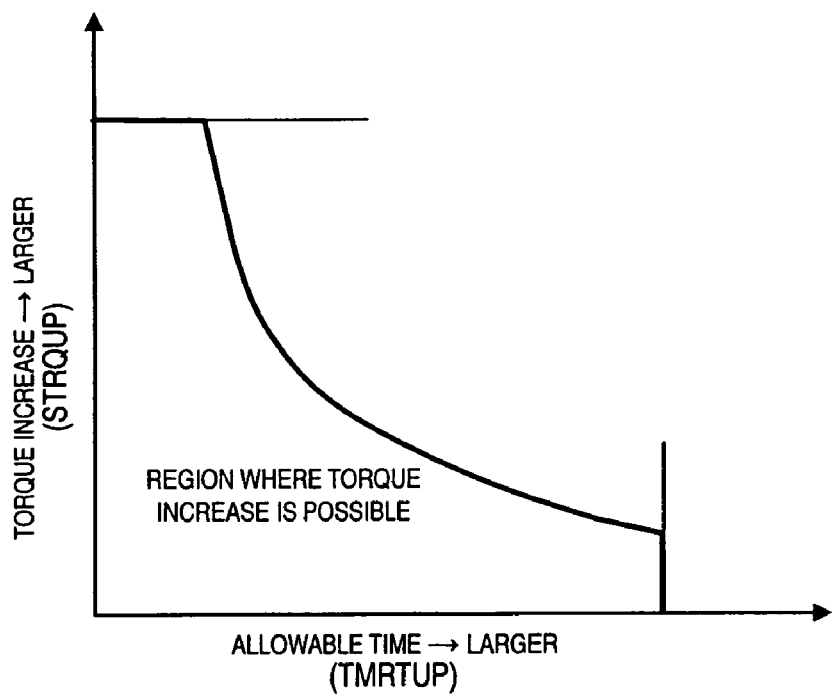
FIG. 7 is a graph illustrating an example of setting up a table that gives allowable torque increase times in accordance with torque increase amounts.

The allowable torque increase time TMRTUP is set, for example by consulting a table that has been preset so as to give the allowable torque increase time TMRTUP corresponding to the standardized torque increase amount STRQUP, as shown in FIG. 7.

As shown in FIG. 7, the table of allowable times TMRTUP is set so that the larger is the standardized torque increase amount STRQUP, the shorter is the allowable torque increase time TMRTUP.

In step S206, the allowable torque increase time setting component 221 determines whether or not the standardized torque increase amount STRQUP is zero or less. In other words, the allowable torque increase time setting component 221 determines whether or not the automatic transmission required torque TRQNUT is equal to or less than the driver's required torque TTEIF. If the condition STRQUP>0 is met, then the process moves to the processing of step S207 and beyond, but if STRQUP≦0, then the process moves to step S212.

In step S207, the torque change ΔTU between the standardized torque increase amount STRQUP and the stored value STRQUP1 (the previous value of the standardized torque increase amount STRQUP) is calculated. At the start of torque increasing control, the stored value STRQUP1 is zero because of the initialization performed in step S215, so at the beginning the standardized torque increase amount STRQUP is set directly as the change ΔTU.

In step S208, the allowable torque increase time setting component 221 determines whether or not the torque change ΔTU is zero or less. If the torque change ΔTU is greater than zero (ΔTU>0), then the allowable torque increase time TMRTUP is corrected downward according to the standardized torque increase amount STRQUP in step S209. This correction, as shown in FIG. 8, is performed by checking a table that has been preset so as to give a reduction correction amount TRED according to the standardized torque increase amount STRQUP.

Figure 8:
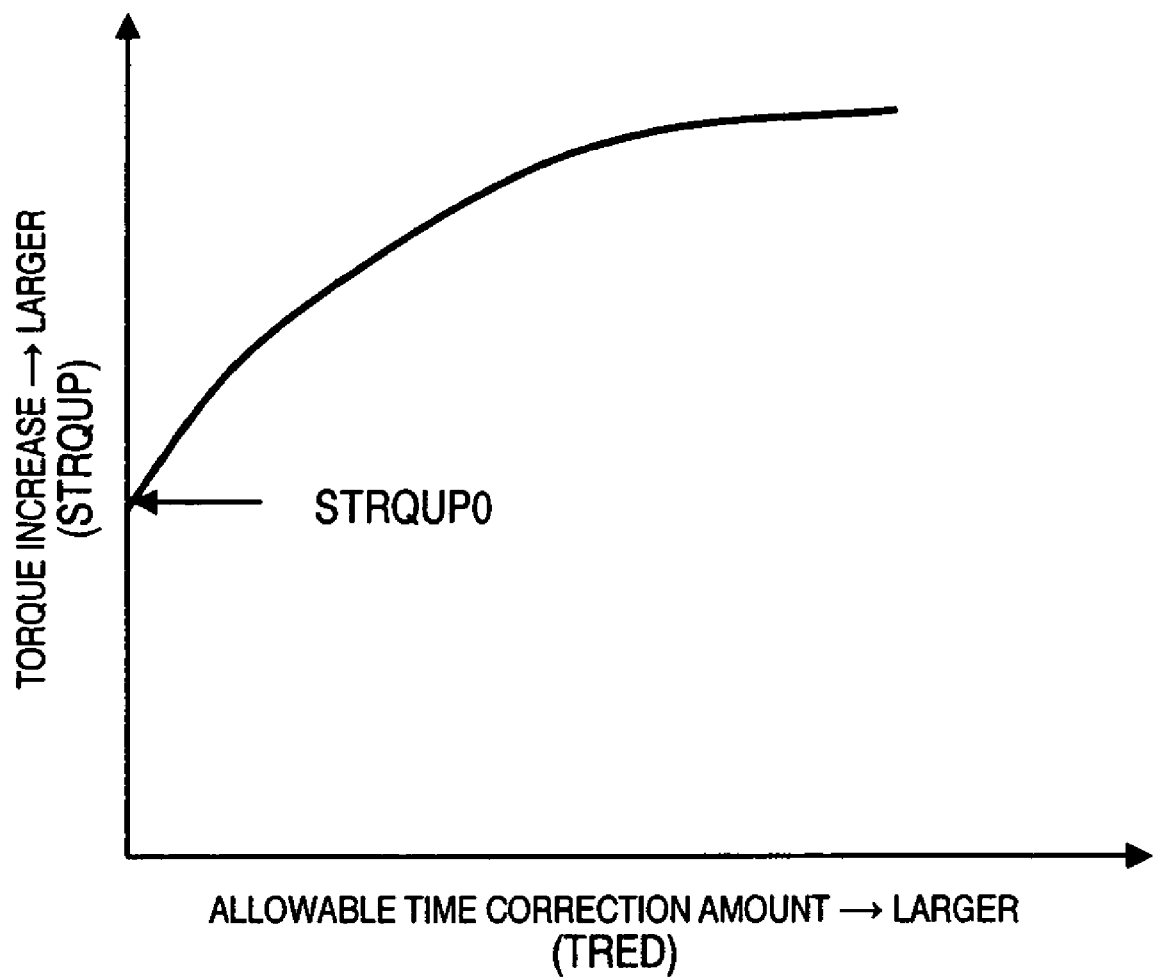
FIG. 8 is a graph illustrating an example of setting up a table that gives reduction correction amounts for allowable torque increase times in accordance with torque increase amounts.

As shown in FIG. 8, the reduction correction amount TRED of the allowable torque increase time TMRTUP is set so as to increase in proportion to how much larger the standardized torque increase amount STRQUP is than the initial value STRQUP0 at the start of torque increasing control. The correction is such that the greater is the standardized torque increase amount STRQUP from the start of torque increasing control, the shorter is the allowable torque increase time TMRTUP.

When the torque change ΔTU is less than or equal to zero (ΔTU≦0), then step S209 is skipped, and then the process moves to the processing of step S210 and beyond.

The reduction correction of the allowable torque increase time TMRTUP is executed only when the standardized torque increase amount STRQUP has changed upward as a result of the determination in step S208 discussed above. When there is no change or a downward change occurs in the standardized torque increase amount STRQUP, the previously set allowable time is maintained unchanged.

In step S210, the timer value TCU of the count-up timer is added, and then in step S211, this timer value TCU is compared to the allowable torque increase time TMRTUP. The timer value TCU is the time elapsed since the start of the torque increasing control. If the pertinent timer value TCU has not reached the allowable torque increase time TMRTUP, then the process proceeds to step S212.

In step S212, the current torque increase amount STRQUP is stored as the previous value STRQUP1, and then the process proceeds to step S213.

In step S213, the automatic transmission required torque is outputted as the target engine torque TRQNUT, then the process returns to the start of the control routine, and the above processing is repeated.

On the other hand, if the elapsed time since the start of torque increasing control as measured by the timer value TCU has reached the allowable torque increase time TMRTUP, then the process proceeds to step S214.

In step S214, the allowable torque increase time setting component 221 determines whether or not the standardized torque increase amount STRQUP is less than a specified value STRQUPSL. The specified value STRQUPSL is set as the amount of increase necessary to ensure the torque (0 Nm+a minute value) needed to maintain the engine speed once the post-shift target engine speed has been approximately reached. Thus, it is determined whether or not the standardized torque increase amount STRQUP is the torque increase needed to maintain the engine speed at that point.

When the standardized torque increase amount STRQUP is less than the specified value STRQUPSL, then the process proceeds to step S212, and torque increasing control is continued even after the allowable torque increase time TMRTUP has elapsed. On the other hand, when the standardized torque increase amount STRQUP is equal to or greater than the specified value STRQUPSL, then the process proceeds to step S215, and the torque increasing control is forcibly concluded.

If the standardized torque increase amount STRQUP is less than the specified value STRQUPSL, then even if a torque increase amount STRQUP should be given by malfunction, the driver will not experience any jerkiness of the vehicle. Also if the shift has not actually been completed, the target engine speed can be maintained until the completion of the shift, thereby avoiding a dropoff in engine speed prior to the completion of a shift and the occurrence of shift shock.

In the determination performed in step S206, if the standardized torque increase amount STRQUP is zero or less, that is, if it is determined that the automatic transmission required torque TRQNUT is less than or equal to the driver's required torque TTEIF, then neither the reduction correction nor the timer measurement of the allowable torque increase time is performed in steps S207 to S211, the allowable torque increase time TMRTUP is kept at its current value and the elapsed time measurement after the start of torque increasing control is interrupted, at which point then the process moves to the processing of step S212 and beyond.

FIGS. 9 to 12 show examples of the characteristics of the torque increasing control pertaining to this embodiment.

Figure 9:
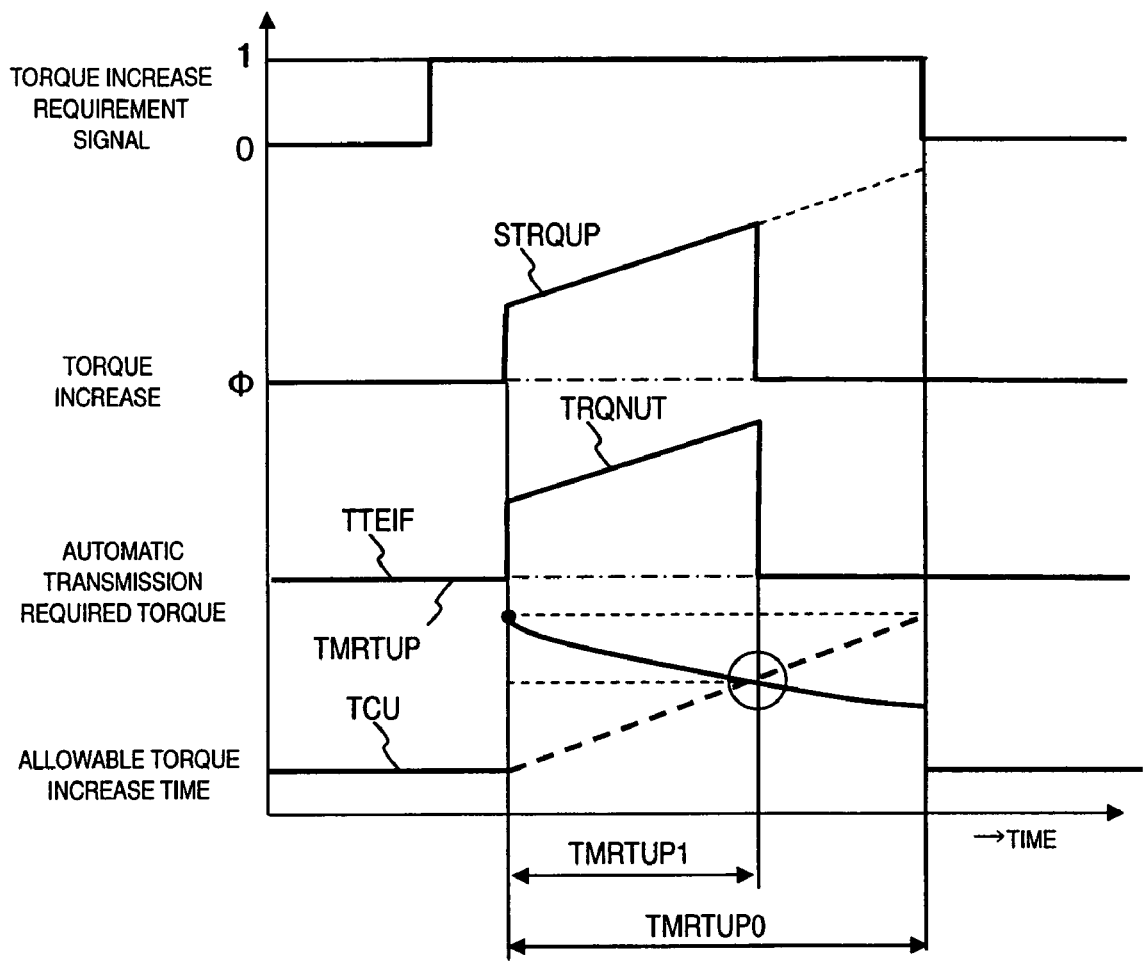
FIG. 9 is a first time chart illustrating the control characteristics of selected vehicle parameters occurring during the control executed by the engine torque control device of the present invention.

FIG. 9 shows the control characteristics when the automatic transmission required torque TRQNUT (torque increase amount STRQUP) changes upward over time after the start of torque increasing control. In this case, as the processing in steps S207 to S211 in FIG. 5 result in an increase in the automatic transmission required torque TRQNUT, the allowable torque increase time TMRTUP is subjected to reduction correction from the initial value TMRTUP0 to TMRTUP1, and the torque increasing control is concluded quickly, thereby avoiding the problem of a state of excessive engine torque generation being prolonged unnecessarily, and allowing the automatic transmission to be protected.

If we turn our attention to how the shift shock of the automatic transmission is reduced, we see that there is a general trend in which the greater is the amount of torque increase for reducing shock, the shorter is the time it takes to perform the torque increase, so torque control during shifting can be optimizing with the above control.

Figure 10:
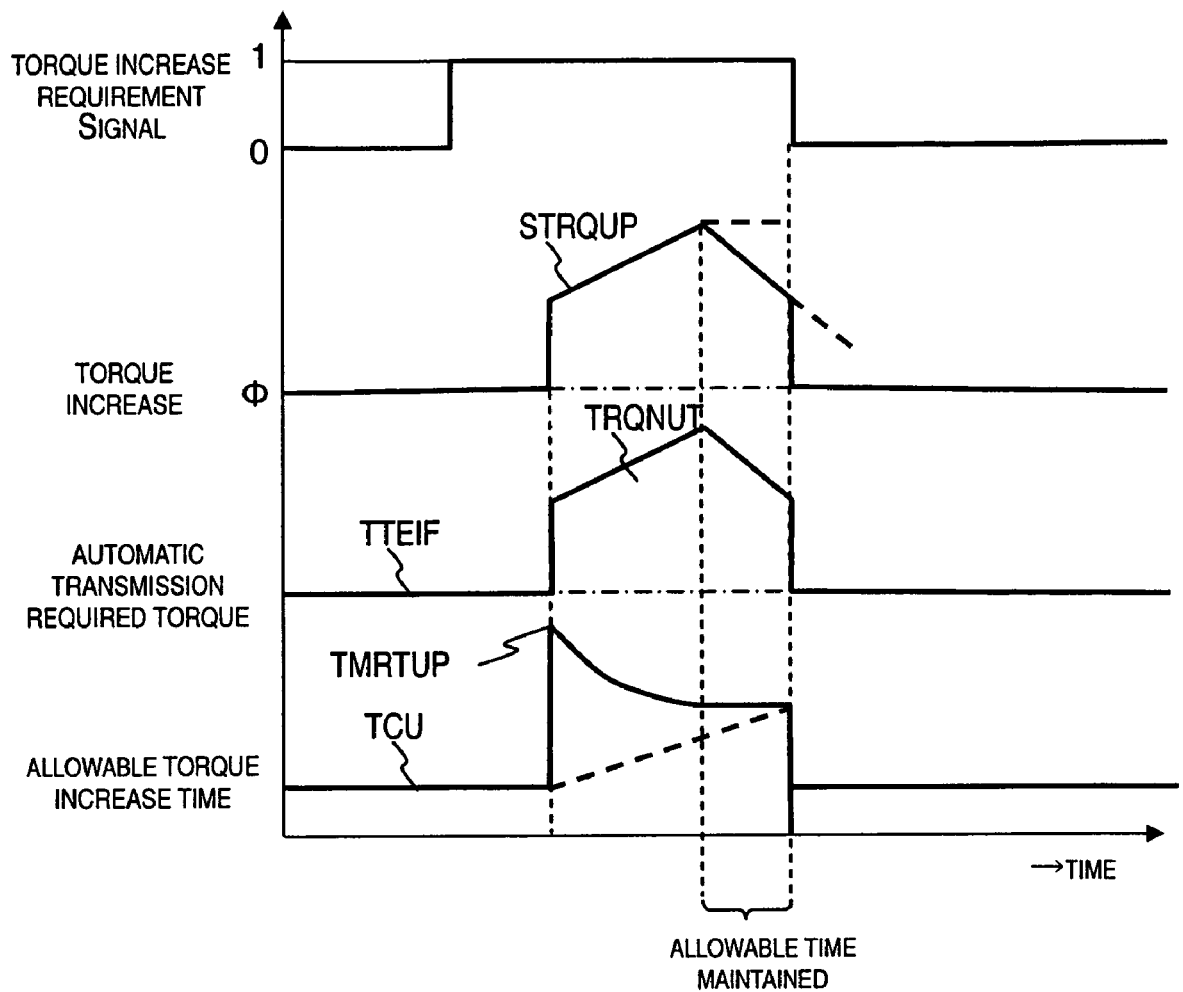
FIG. 10 is a second time chart illustrating the control characteristics of selected vehicle parameters occurring during the control executed by the engine torque control device of the present invention.

FIG. 10 shows the control characteristics when the automatic transmission required torque TRQNUT increases immediately after the start of torque increasing control, and then decreases from a midway point.

In this case, while the automatic transmission required torque TRQNUT is increasing, the allowable torque increase time TMRTUP is subjected to reduction correction in the same manner as in FIG. 9.

In contrast, while the automatic transmission required torque TRQNUT is decreasing, the correction of the allowable torque increase time TMRTUP by the processing in step S208 in FIG. 5 is to performed, and the allowable time prior to the decrease is maintained.

Figure 11:
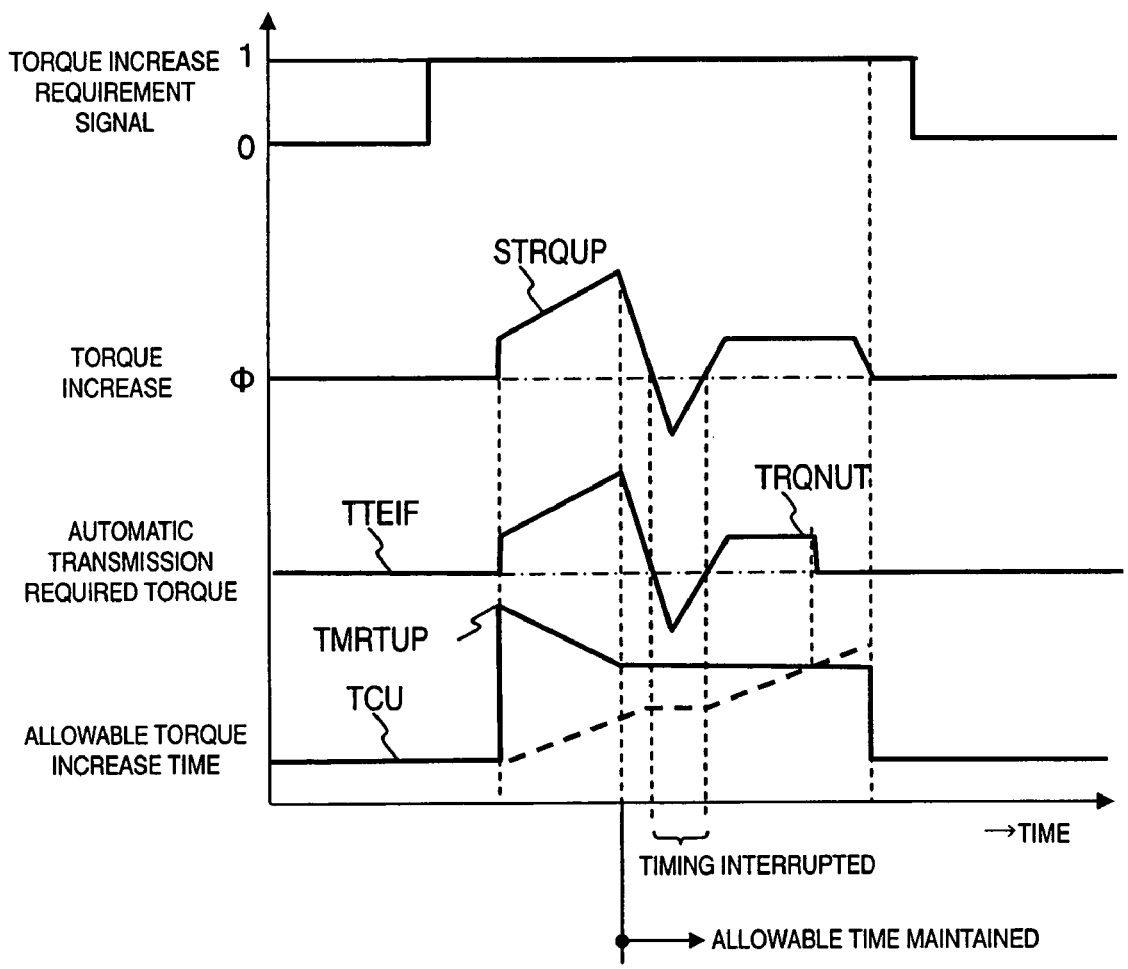
FIG. 11 is a third time chart illustrating the control characteristics of selected vehicle parameters occurring during the control executed by the engine torque control device of the present invention.

Meanwhile, FIG. 11 shows the control characteristics when the automatic transmission required torque TRQNUT is repeatedly increased and decreased during torque increasing control, and drops under the driver's required torque TTEIF at a midway point. In this case, under conditions in which the standardized torque increase amount STRQUP is zero or less, that is, when the automatic transmission required torque TRQNUT decreases to or under the driver's required torque TTEIF, on the basis of the determination in step S206 in FIG. 5, the allowable torque increase time TMRTUP is not just maintained at its current level, but the addition of the timer value TCU is also avoided and the timing is interrupted.

Thus, under condition where engine torque will have little effect on the automatic transmission, as when the automatic transmission required torque TRQNUT decreases, or when the torque drops to or under the driver's required torque TTEIF in the course of the torque increasing control in this embodiment, the shortening correction of the allowable torque increase time is halted or the measuring of the allowable torque increase time is interrupted, which promotes the optimization of torque increasing control.

Figure 12:
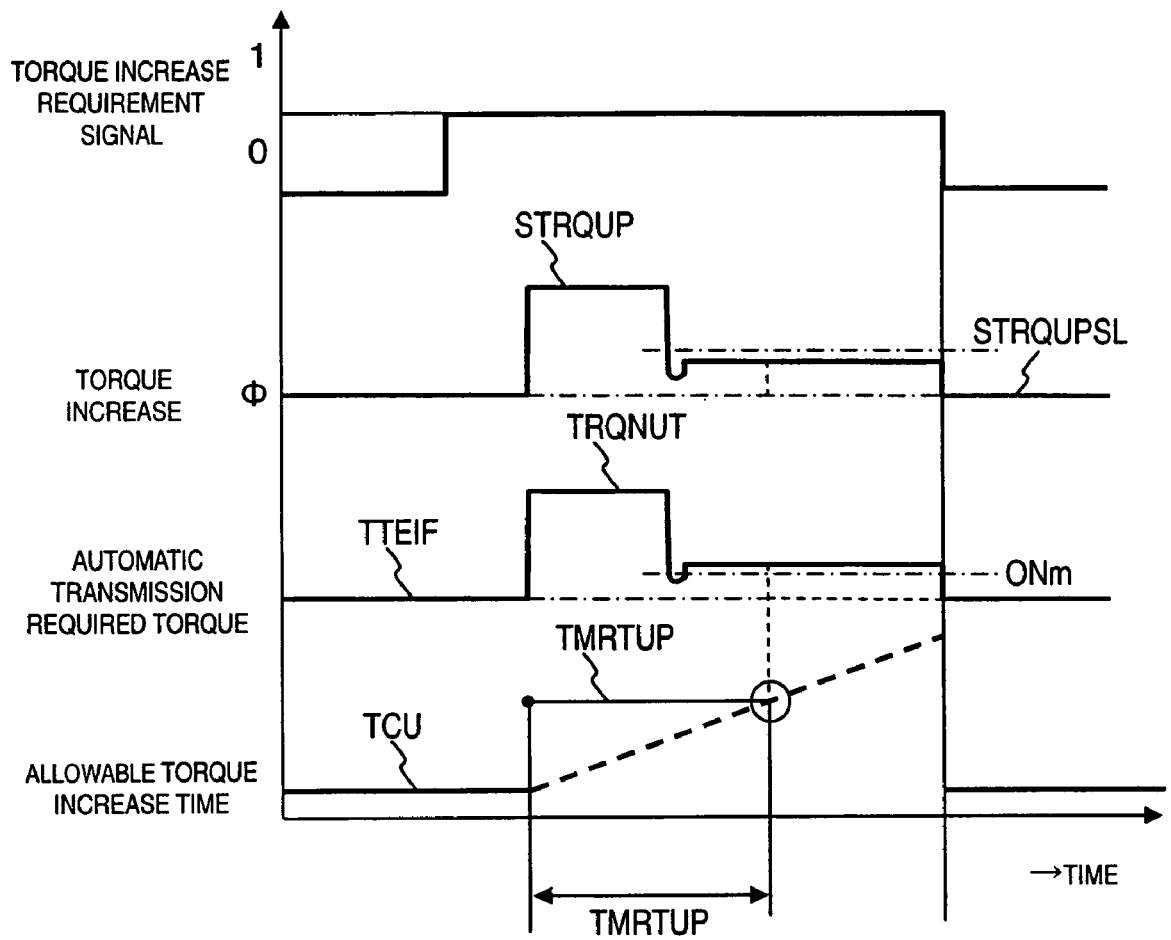
FIG. 12 is a fourth time chart illustrating the control characteristics of selected vehicle parameters occurring during the control executed by the engine torque control device of the present invention.

FIG. 12 shows the control characteristics when torque increasing control is continued even after the allowable torque increase time TMRTUP has elapsed. In this case, engine speed reaches the target engine speed before the allowable torque increase time TMRTUP has elapsed, and the standardized torque increase amount STRQUP is set such that, at the point when the allowable torque increase time TMRTUP has elapsed, the automatic transmission required torque TRQNUT will be slightly over 0 Nm and the engine speed at that point can be maintained, and on the basis of the determination in step S214 in FIG. 5, an automatic transmission required torque TRQNUT that is slightly over 0 Nm will be given even after the allowable torque increase time TMRTUP has elapsed, and engine speed can be maintained.

Therefore, torque increasing control is forcibly concluded at the point when the allowable torque increase time TMRTUP has elapsed, and as a result, the engine speed subsequently decreases, engagement of the friction engagement elements is performed once the speed has thus decreased, and this avoids the occurrence of shift shock.

Also, if the standardized torque increase amount STRQUP is set high, over the increase necessary to maintain engine speed, torque increasing control is concluded immediately at the point when the allowable torque increase time TMRTUP has elapsed, thereby avoiding the problem of a state of excessive engine torque generation being prolonged unnecessarily, and allowing the automatic transmission to be protected.

Only the case of manual shift mode was described in the above embodiment, but it should go without saying that the present invention is not limited to this, and can also be applied to downshifting in automatic shift mode. Also, in addition to controlling the opening of the throttle valve 4, the ignition timing may instead be controlled so as to increase engine output torque.

Furthermore, ignition timing control can be performed in order to quickly lower engine output torque when torque increasing control is concluded.

As used herein to describe the above present invention, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", a"bout" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine torque control device comprising:
    an automatic transmission control section configured to perform an automatic transmission control of an automatic transmission; and
    an engine output torque control section configured to perform an engine output torque increasing control of an engine output torque from an engine such that engine output torque increases during a downshifting of the automatic transmission so that an actual engine speed will substantially approach a target speed,
    the engine output torque control section being further configured to set an allowable time to perform the torque increasing control, and to forcibly halt the torque increasing control at a point when the allowable time has elapsed since starting the engine output torque increasing control if an increase in the engine output torque is equal to or greater than a specific amount, and to allow the engine output torque increasing control to continue if the increase is less than the specific amount.

2. The engine torque control device according to claim 1, wherein
    the engine output torque control section is further configured to set the allowable time according to a torque increased amount that the engine output torque has increased by the torque increasing control.

3. The engine torque control device according to claim 2, wherein
    the engine output torque control section is further configured to maintain the allowable time at a start of a reduction in the torque increased amount, when the torque increased amount in the engine output torque during the engine output torque increasing control is reduced.

4. The engine torque control device according to claim 1, wherein
    the engine output torque control section is further configured to set the allowable time for each gear of the automatic transmission.

5. The engine torque control device according to claim 1, wherein
    the engine output torque control section is further configured to interrupt measurement of the allowable time, when a target engine output torque in the engine output torque increasing control is less than a driver's required torque.

6. The engine torque control device according to claim 1, wherein
    the engine output torque control section is further configured to increase the engine output torque by increasing a throttle opening during the engine output torque increasing control.

7. The engine torque control device according to claim 2, wherein
    the engine output torque control section is further configured to set the allowable time for each gear of the automatic transmission.

8. The engine torque control device according to claim 2, wherein
    the engine output torque control section is further configured to interrupt measurement of the allowable time, when a target engine output torque in the engine output torque increasing control is less than a driver's required torque.

9. The engine torque control device according to claim 2, wherein
    the engine output torque control section is further configured to increase the engine output torque by increasing a throttle opening during the engine output torque increasing control.

10. The engine torque control device according to claim 3, wherein
    the engine output torque control section is further configured to set the allowable time for each gear of the automatic transmission.

11. The engine torque control device according to claim 3, wherein
    the engine output torque control section is further configured to interrupt measurement of the allowable time, when a target engine output torque in the engine output torque increasing control is less than a driver's required torque.

12. The engine torque control device according to claim 3, wherein
    the engine output torque control section is further configured to increase the engine output torque by increasing a throttle opening during the engine output torque increasing control.

13. The engine torque control device according to claim 4, wherein
    the engine output torque control section is further configured to interrupt measurement of the allowable time, when a target engine output torque in the engine output torque increasing control is less than a driver's required torque.

14. The engine torque control device according to claim 4, wherein
the engine output torque control section is further configured to increase the engine output torque by increasing a throttle opening during the engine output torque increasing control.

15. The engine torque control device according to claim 5, wherein
the engine output torque control section is further configured to increase the engine output torque by increasing a throttle opening during the engine output torque increasing control.

16. The engine torque control device according to claim 10, wherein
the engine output torque control section is further configured to interrupt measurement of the allowable time, when a target engine output torque in the engine output torque increasing control is less than a driver's required torque.

17. The engine torque control device according to claim 16, wherein
the engine output torque control section is further configured to increase the engine output torque by increasing a throttle opening during the engine output torque increasing control.

18. An engine torque control device comprising:
automatic transmission control means for performing an automatic transmission control of an automatic transmission; and
engine output torque control means for performing an engine output torque increasing control of an engine output torque from an engine such that engine output torque increases during a downshifting of the automatic transmission so that an actual engine speed will substantially approach a target speed, for setting an allowable time to perform the torque increasing control, for forcibly halting the torque increasing control at a point when the allowable time has elapsed since starting the engine output torque increasing control if an increase in the engine output torque is equal to or greater than a specific amount, for allowing the engine output torque increasing control to continue if the increase is less than the specific amount.

19. A method of controlling engine torque comprising:
controlling an automatic transmission;
controlling engine output torque of an engine by performing an engine output torque increasing control of the engine output torque from an engine such that engine output torque increases during a downshifting of the automatic transmission so that an actual engine speed will substantially approach a target speed;
setting an allowable time to perform the torque increasing control;
forcibly halting the torque increasing control at a point when the allowable time has elapsed since starting the engine output torque increasing control and when an increase in the engine output torque is equal to or greater than a specific amount; and
allowing the engine output torque increasing control to continue if the increase is less than the specific amount.

* * * * *